May 1, 1962 R. E. MILLER 3,032,200
SIFTER DRIVE

Filed April 14, 1960 3 Sheets-Sheet 1

INVENTOR.
Rufus E. Miller
BY
Paul E. Mullendore
ATTORNEY

May 1, 1962 R. E. MILLER 3,032,200
SIFTER DRIVE
Filed April 14, 1960 3 Sheets-Sheet 2
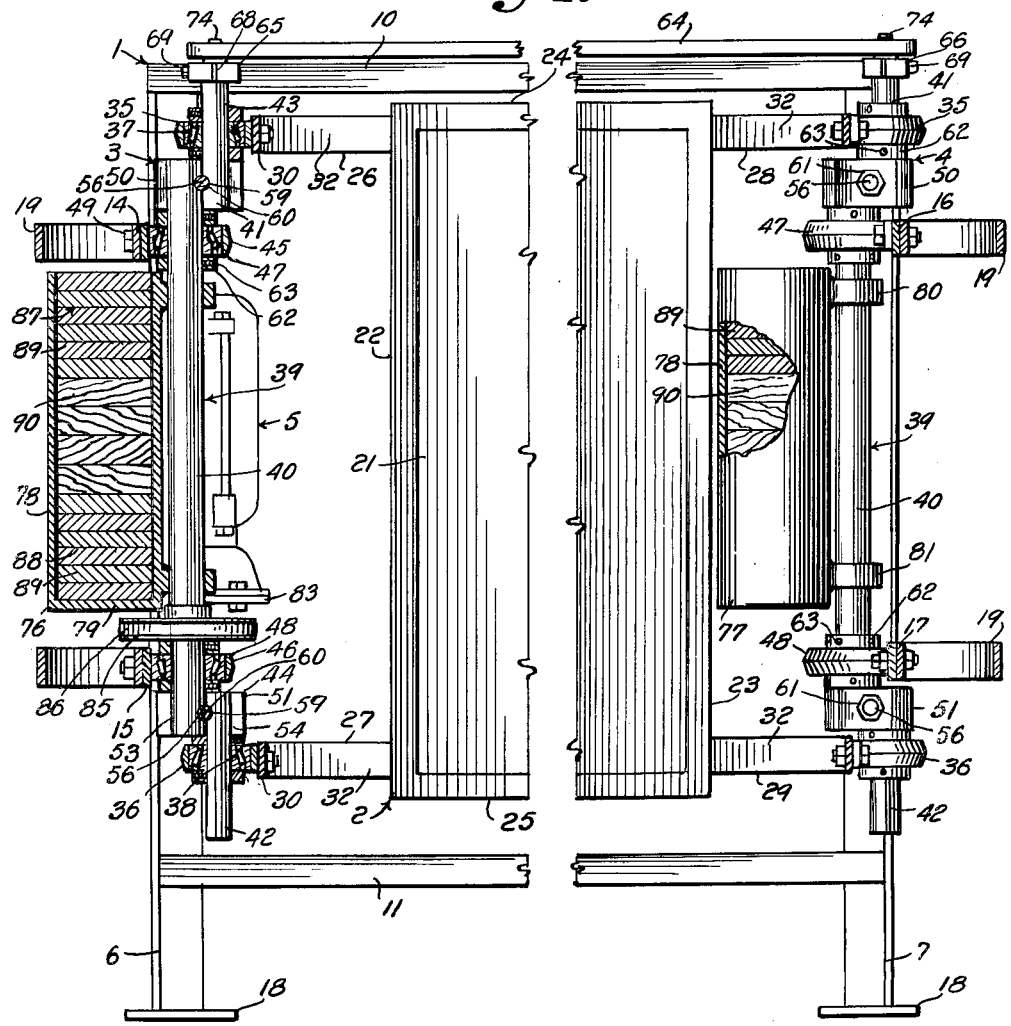
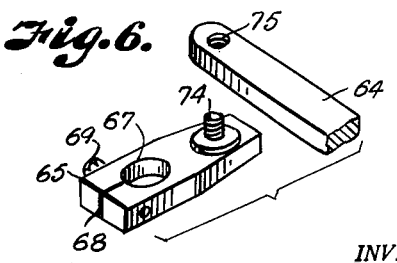
INVENTOR.
Rufus E. Miller
BY
*Paul E. Mullendore*
ATTORNEY May 1, 1962 R. E. MILLER 3,032,200
SIFTER DRIVE
Filed April 14, 1960 3 Sheets-Sheet 3
*Fig. 7.*
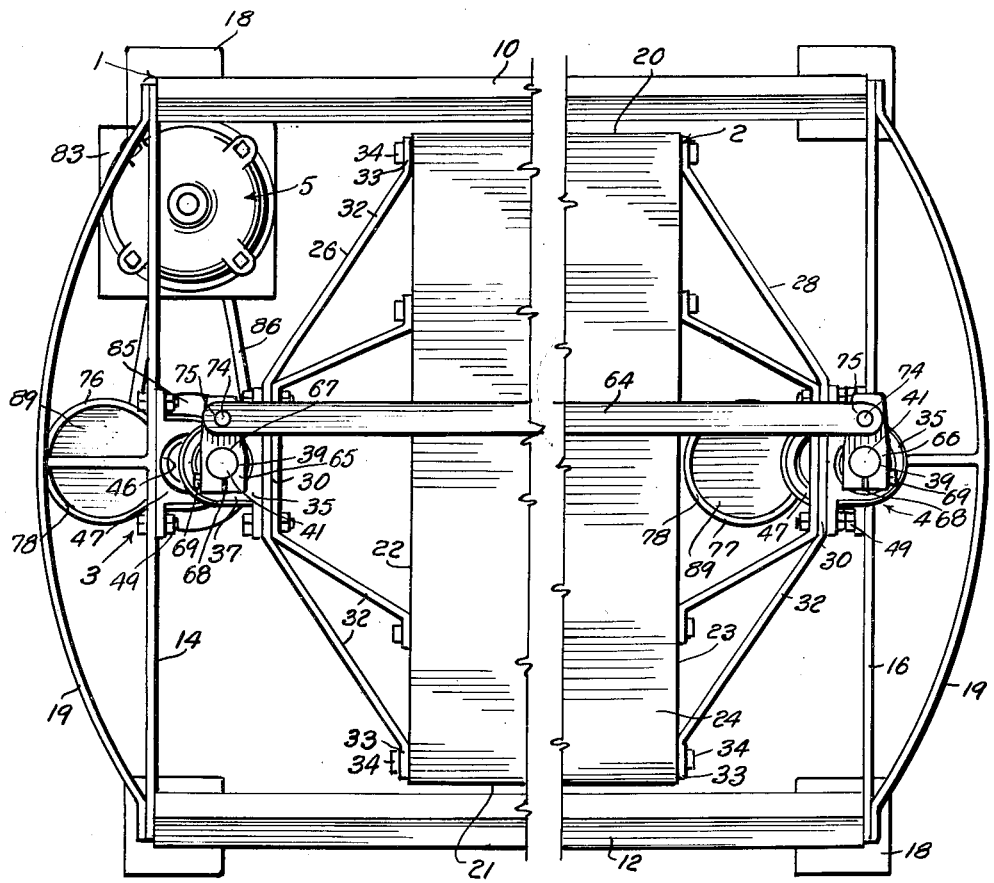
*Fig. 8.* *Fig. 9.*
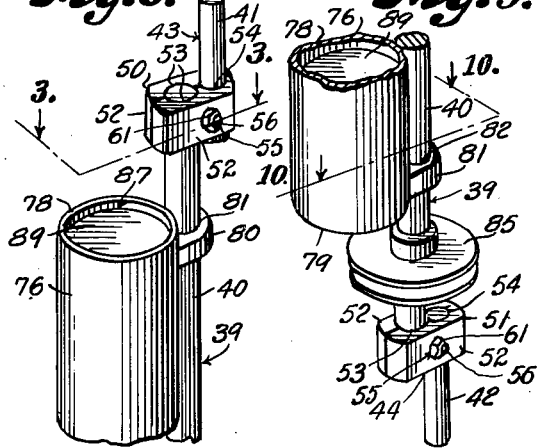
*Fig. 10.*
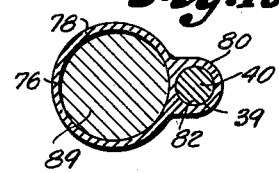
INVENTOR.
Rufus E. Miller
BY Paul E. Mullendore
ATTORNEY United States Patent Office 3,032,200
Patented May 1, 1962

3,032,200
SIFTER DRIVE
Rufus E. Miller, Leavenworth, Kans., assignor to Great Western Manufacturing Company, Leavenworth, Kans., a partnership
Filed Apr. 14, 1960, Ser. No. 22,150
8 Claims. (Cl. 209—366)

This invention relates to sifters and similar machines for sifting, cleaning or grading various comminuted or ground materials.

Machines of this character usually have the sifting elements enclosed in a casing or carrier having bodily support for gyration in a generally horizontal plane. Heretofore the most common support for gyratory movement of the sifting elements has been by reeds suspended from the ceiling or by links to support them from the floor, in such manner that the reeds or links swing in circular paths to effect a gyratory motion under actuators of a variety of types that are connected to the carrier for the sifter elements. With such arrangements the thrusts of the actuators resulted in substantial friction and vibration destructive to the machines and buildings in which they were housed. To reduce these difficulties, balance was attained by weights combined with moment arms, but this principle of balancing the thrust of the actuators magnified the force loads acting upon the bearings and structural members forming parts of such machines. Consequently, increased requirements for resisting such factors resulted in high cost for adequate bearings and materials in the construction of the machines. Furthermore, any slight out-of-balance or wear producing out-of-balance conditions increased the bad effects.

Many attempts have been made to construct sifters without reeds or other swinging supports by the provision of a stationary frame adapted to be mounted on the floor and to provide eccentrics for gyrating and supporting the carrier for the sifting elements at opposite sides thereof. Such eccentrics were intended to be rotated simultaneously and in timed relation to produce gyratory action of the sifter elements, but prior to the present invention this type of machine has, perhaps, been even more undesirable because of the difficulties in keeping the eccentrics in exact relationship and applying balances for counterbalancing thrusts and imparting inertia for a smooth gyratory action. It was found that any out-of-balance at the respective sides of the sifter or any out-of-timing, particularly in the eccentric drives at the respective sides of the sifter, resulted in poor operation and at times even prevented the machines from operating. Also, such machines were difficult to start when the eccentrics stopped in dead center position. However, machines having stationary floor mounted frames were desirable.

Therefore, the principal object of the present invention is to provide a sifter having a floor mounted stationary support in which the sifter elements are bodily supported between vertically disposed crankshafts, with means for retaining the crankshafts in precisely timed relation and for preventing stoppage of the eccentrics on dead center.

Other objects of the invention are to provide the crankshafts with buckets for containing counterbalance weights in a number and arrangement for effecting balance at each side of the machine; to provide a simple and easily assembled crankshaft construction in which the mid or shaft portion is adapted for support near the cranks thereof in relatively small sized antifriction bearings; to provide cranks thereof with similar relatively small sized antifriction bearings carried by brackets that are attached to the opposite sides of the carrier for the sifter elements; and to provide a sifter of generally simple, light weight construction and free of destructive vibrations and thrust loads on the antifriction bearings and other parts of the machine.

It is a further object of the invention to provide an operative connection between the cranks of the crankshafts by links having antifriction connections with arms of the shafts, thereby eliminating looseness of parts and maintaining the crankshafts in exact relationship with respect to each other, so that the gyratory movement of the sifter elements is kept uniform at both sides thereof.

Another object of the invention is to provide a simple, efficient and solid driving connection between the crankshafts.

It is also an object of the invention to support the weight elements that are inserted in the weight buckets in close relation to the bearings that carry the crankshafts, and to maintain them in such relation by light weight spacers.

In accomplishing these and other objects of the invention as hereinafter pointed out, I have provided an improved structure, the preferred form of which is illustrated in the accompanying drawings, wherein:

FIG. 4 is a side elevational view of the sifter with the center portion broken away to shorten the figure and showing parts in section to better illustrate the construction thereof.

FIG. 5 is a detail view, partly in section, showing the antifriction connection of the tie bar with one of the arms of the crankshafts.

FIG. 6 is a similar view showing the parts that are illustrated in FIG. 5, in disassembled, spaced relation.

FIG. 7 is a plan view of the sifter, with the figure being shortened in accordance with FIG. 4.

FIG. 8 is a perspective view of the upper portion of one of the crankshafts.

FIG. 9 is a similar view of the lower portion of the crankshaft.

FIG. 10 is a cross section through a crankshaft on the line 10—10 of FIG. 9, particularly illustrating mounting of the weight bucket.

Figure 1:
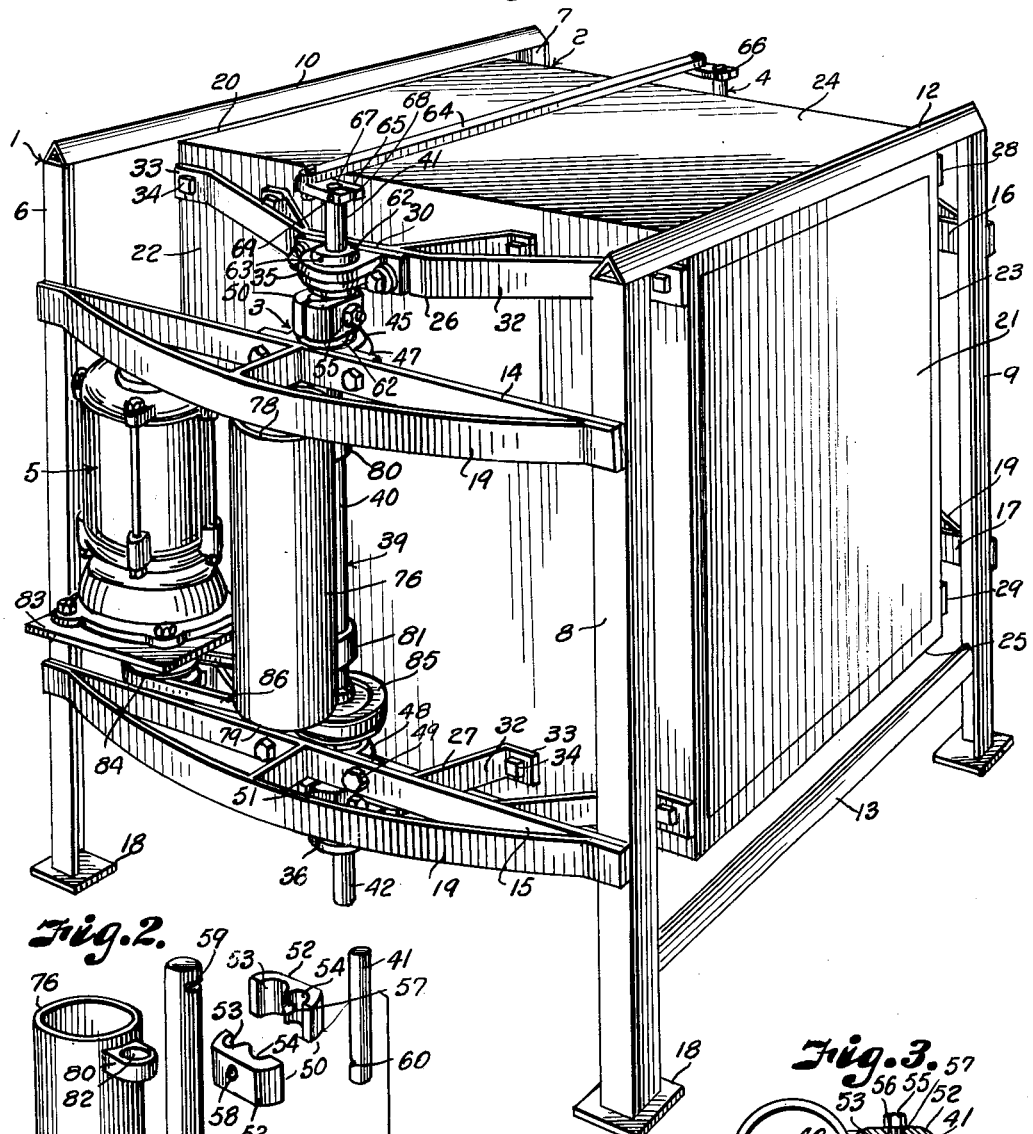
FIG. 1 is a perspective view of a sifter embodying the features of the present invention.

Referring more in detail to the drawings:

A sifter embodying the present invention includes a stationary frame 1, a carrier 2 for containing one or more sifting trays or elements (not shown), operating mechanisms 3 and 4 for bodily supporting and gyrating the carrier, and a motor 5.

The frame 1 is generally rectangular and includes vertical legs 6, 7, 8 and 9 that may constitute the four corners of the frame. The legs 6 and 7 are connected by upper and lower longitudinal members 10 and 11 and the legs 8 and 9 are connected by similar longitudinal members 12 and 13. The legs 6 and 8 are connected by vertically spaced apart transverse members 14 and 15, and the legs 7 and 9 are connected by similar transverse members 16 and 17. The legs 6, 7, 8 and 9 have foot plates or pads 18 connected with the lower ends therof to provide support of the frame directly upon the floor. The transverse members may also include as a part thereof outwardly extending guards 19 to cooperate in providing mounts for the operating meachanisms 3 and 4 at the respective opposite sides of the frame.

The carrier 2 may comprise a casing having side walls 20 and 21, end walls 22 and 23, a bottom 25, and a top 24, to enclose and support therein one or more screen or sifter elements, not shown since the specific structure thereof forms no part of the present invention. It is also to be understood that the carrier 2 may be a casing as illustrated, or it may be of a type wherein the screens or sifting elements are clamped together in superimposed relation, depending upon the use of the sifter and types of materials to be separated or classified. It is also to be understood that the carrier will be equipped with the usual inlet and outlet connections through which the stock material is delivered into the casing and the separated components are removed. The arrangement and number of the inlets and outlets are, of course, dependent upon the type and use of the sifter and, therefore, these connections are not illustrated in the present drawings. The casing also has removable panels or doors for access to the sifter elements, as in the case of conventional sifters. The importance is that the carrier have upper and lower portions to provide areas for attachment of vertically spaced apart brackets 26—27 and 28—29 at the respective ends or sides thereof. For example, in the illustrated instance the brackets are attached to the upper and lower portions of the end walls of the casing.

In the illustrated instance, the brackets have inner and outer plate portions 30 terminating in diverging legs 32 having foot portions 33 attached to the end walls of the casing by suitable fastening devices 34, whereby the plate portions 30 are spaced outwardly from the end walls of the casing to mount upper and lower bearing blocks 35 and 36 thereon. The bearing blocks carry antifriction bearings 37 and 38 to connect the carrier with the operating mechanisms 3 and 4 and to support the carrier for gyratory or orbital movement within the stationary frame. The size of the frame relatively to the carrier is such as to accommodate the desired gyratory movement within the limits of the longitudinal and transverse members of the frame and to provide ample clearance at the ends thereof for accommodating the operating mechanisms and movement of the revolving parts thereof, as now to be described.

In carrying out the present invention, the forces necessary to impart gyratory action to the carrier and place the particles to be sifted in orbital motion are produced at both ends of the carrier by the operating mechanisms 3 and 4, thereby permitting substantially complete equalization of the operating forces and balance between the rotary motion of the operating mechanisms.

Each operating mechanism is of like construction to include a vertically disposed crankshaft 39 at each end of the frame. The crankshafts 39 are of identical construction and each one has a main shaft portion 40 adapted to rotate on a fixed vertical axis, and end shaft portions 41 and 42 offset radially from and parallel with the fixed axis of the main shaft portion 40 to provide cranks 43 and 44 having vertical axes adapted to revolve about the fixed axis of the main shaft portion 40. The main shaft portion 40 is of a length for rotatable support in antifriction bearings 45 and 46 that are carried in bearing blocks 47 and 48 that are attached to the inner sides of the transverse members 14–15, or 16–17, as the case may be. The bearing blocks 47 and 48 are secured at the midportion of the transverse members 14–15 and 16–17 by fastening devices 49. The ends of the main shaft portion 40 project beyond the upper and lower bearings 45 and 46 for attachment of the end shaft portions 41 and 42 thereto by clamps 50 and 51 to permit passage of the main shaft portion 40 through the antifriction bearings 45 and 46 when the parts are assembled. The end shaft portions 41 and 42 have ends thereof lapping the projecting ends of the main shaft portion 40 to accommodate the clamps 50 and 51.

Figure 2:
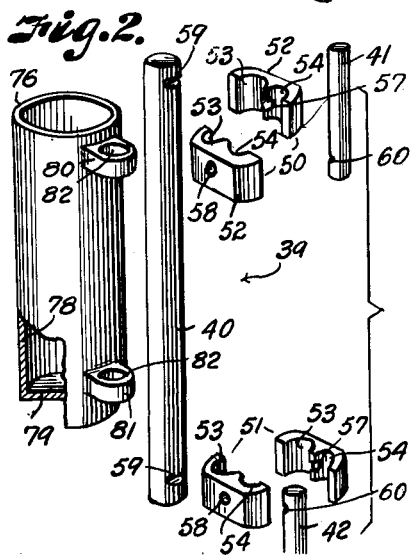
FIG. 2 is a perspective view of the parts of one of the crankshafts and weight bucket thereof, shown in disassembled, spaced relation.
Figure 3:
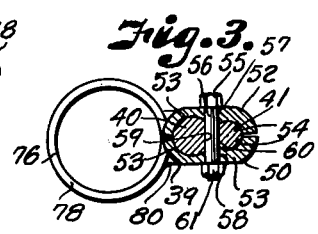
FIG. 3 is a cross section through one of the crankshafts, taken on the line 3—3 of FIG. 8, particularly illustrating the connection of the bearing supported portion of the crankshaft with the upper crank portion; the weight bucket being shown in plan.

The clamps 50 and 51 are of like construction, and include blocks 52, each having arcuate recesses 53 and 54 to seat the overlapping ends of the respective shaft portions therein. The clamps 50 and 51 are secured together on opposite diametrical sides of the shaft portions by fastening devices such as bolts 55 having the shanks 56 thereof extending through registering openings 57 and 58 in the blocks (FIGS. 2 and 3) and through registering transverse grooves 59 and 60 in the facing sides of the shaft portions, so that when nuts 61 are tightened on threaded ends of the shanks, the blocks clamp the shaft portions tightly therebetween. The clamps not only fix the end shaft portions together to provide the cranks, but the fastening devices form keys to maintain the end shaft portions in vertical registration with each other, as shown in FIG. 4.

The outer ends of the shaft portions 41 and 42 pass through the antifriction bearings 37 and 38, and terminate above and below the top and bottom 24 and 25 of the carrier 2, as best shown in FIG. 4.

The antifriction bearings 45 and 46 are secured in their proper position on the respective shaft portions 40 by collars 62 anchored by set screws 63. The collars 62 for retaining the upper bearings 45 ride upon the upper clamps 50 to support the weight of the carrier 2 within the stationary frame while the main shaft portions 40 are retained from movement in an axial direction by the collars that retain the main bearings.

It is thus obvious that the carrier is bodily supported by the crankshafts 39 and that when the crankshafts 39 are rotated, as later described, the end shaft portions 41 and 42 that provide the cranks 43 and 44 revolve to impart gyratory motion to the carrier with the actuating force applied to one of the crankshafts 39. The crankshafts are kept in synchronism and in timed relation with each other by connecting one of the crankshafts with the other through a tie bar or connecting link 64. The tie bar or connecting link 64 may be connected with either the upper or lower end shaft portions 41 or 42. In the illustrated instance, the tie bar or connecting link 64 connects with the upper end shaft portions 41, as now to be described.

Fixed to the upper ends of the shaft portions 41 are arms 65 and 66 for the respective shafts. The arms 65 and 66 are fixed at substantially right angles to the cranks 43 by providing the arms with openings 67 (FIG. 6) and with slots 68 that extend through the ends of the arms, as shown in FIG. 6, whereby the arms may be clamped to the end shaft portions 41 by clamp screws 69 so that the outer ends thereof lag the cranks 43 and 44 by substantially 90°. Retained within openings 71 in the outer ends of the arms are antifriction bearings 72 (FIGS. 5 and 6) carrying wrist pins 73 that are adapted to turn freely within outer races of the bearings. The wrist pins 73 have threaded shanks 74 that are engaged within internally threaded openings 75 in the ends of the tie bar or connecting link 64. Therefore, when one shaft is rotated under power, the other crankshaft is synchronized therewith, as later to be described.

In order to provide balance and provide inertia for smooth rotation of the crankshafts 39, the main shaft portion 40 of each crankshaft carries a weight bucket 76 for the operating mechanism 3 and 77 for the operating mechanism 4. The weight buckets are of like construction and have cylindrical walls 78 open at the upper ends and closed at the lower ends by bottoms 79. The buckets are elongated in the vertical direction thereof, but are sufficiently short to rotate freely between the transverse members 14—15 and 16—17 of the frame. The buckets are connected with the main shaft portions 40 of the crankshafts 39 by ears 80 and 81 that are suitably welded to the side walls of the bucket and which have openings 82 to accommodate the main shaft portions 40 of the crankshafts therein, so that when the ears are connected with the shaft portions 40, for example by welding, the weight buckets will revolve about the fixed axes of the crankshafts 39 on the sides thereof directly opposite the end shaft portions 41 and 42. In revolution of the weight buckets, they pass between the main shaft portions 40 and the adjacent end walls 22 and 23 of the carrier and between upper and lower frame members 14—15 or 16—17.

Fixed to one of the legs of the frame, for example the leg 6, is a platform 83 carrying the electrical motor 5. The motor 5 is mounted with the driveshaft thereof extending through a suitable opening in the platform to carry a driving pulley 84 in alignment with a driven pulley 85 on the main shaft portion of the adjacent crankshaft 39, as best shown in FIGS. 1, 4 and 7. The driving and driven pulleys are shown as provided with grooved peripheries to accommodate an endless belt 86 by which the power of the motor 5 is applied to the driven pulley 85.

The weight buckets contain upper and lower sets 87 and 88 of disk shaped weights 89. The lower set 88 is supported directly upon the bottoms 79 and the upper sets 87 are supported upon light weight spacing disks 90 that may be formed of wood or other light weight material (FIG. 4). By using spacing disks of light weight, the sets of counterbalance disks can be supported in the buckets as close to the main bearings as possible.

Assuming that the sifter is constructed as described, it is located in desired position and connected with a source of the material to be sifted and to discharge ducts for removing the sifted or separated materials. A balance is effected by placing the proper weights in the weight buckets. The motor 5 is connected with a current supply to actuate the operating mechanism 3 through the belt 86 and pulley 85 to rotate the main shaft portion 40 of the crankshaft thereof within the main bearings 45 and 46. Rotation of the main shaft portion causes the cranks 43 and 44 to revolve around the axis of the main shaft portion and impart a gyratory action to the adjacent end of the carrier 2 through the bearings 37 and 38 and brackets 26 and 27. Since the opposite end of the carrier 2 is connected to shaft portions 41 and 42 of the crankshaft at that end by the brackets 28 and 29, the main shaft portion 40 of that crankshaft is turned in the bearings 47 and 48 to cause a like gyration of that end of the carrier 2. The cranks 43 and 44 of one crankshaft will always retain the same relation during gyratory movement of the carrier. Since the crank arms 65 and 66 lag the cranks 43 and 44 by 90° and are interconnected by the tie bar 64, the tie bar will lag the gyratory movement of the carrier 2 by 90°. It is thus obvious that there are two rigid connections between the respective crankshafts 39—39, so that one is always 90° off its dead center position when the other is on its dead center position. Consequently, the connections can never reach their dead center positions at the same time, and the carrier will maintain a smooth gyratory action in a continuous direction. Even if the carrier 2 should happen to stop on dead center relative to the cranks 43 and 44, the tie bar 64 and crank arms 65 and 66 will be effective in moving the carrier through such position when the motor 5 is again started. It is thus obvious that the tie bar 64 supplements the connection through the carrier and keeps the crankshafts in synchronism so that no dead centers can exist anywhere during the cycle of gyration of the carrier 2. Gyratory movement of the carrier places the particles in motion upon the screening elements within the carrier to separate the smaller particles from the larger particles.

The weight buckets 78 revolve around the main shaft portions of the operating mechanisms 3 and 4 in diametrically opposed relation to the crank portions of the crankshafts to balance the operational thrusts applied to the carrier and to provide inertia for maintaining a smooth vibratory action of the carrier, thereby substantially eliminating vibration, and particularly vibration that may be transmitted through the frame 1 to the floor.

It is, therefore, obvious that by eliminating vibration, the mechanical mechanisms of the sifter have a substantially longer life. Furthermore, operation of the sifter is not destructive to the building in which it is installed. It is also obvious that since the carrier is supported for gyratory movement in horizontal plane, the various actions are free of thrusts tending to shift the rotational parts out of the planes in which they are intended to operate. Consequently, friction is greatly reduced and less power is needed to produce the gyratory action. The tie bar drive between the crank shafts has substantially no lost motion, so that the shafts are operated in exact synchronism and it is impossible for the cranks to lock in dead center position. The counterbalance of the divided drives also permits of easier and more efficient counterbalancing of the mechanisms. Also, smaller counterbalances are possible, and counterbalancing is more precise to further the elimination of vibration. The crankshaft structure is simple to produce with precision, and the use of simple, inexpensive antifriction bearings is possible. Another important result is the simple, compact and unitary construction of the sifter with its own individual power, thereby eliminating the usual line shafts or independent motor drives.

The design of this new sifter drive, using the new two bucket weights so placed in position at each end of the machine drive support frame, balances all forces of all nature, producing a machine of complete balance. This is in direct contrast to other sifter drive mechanisms employing the moment arm principle which necessitates using rods or reeds or other supporting devices to overcome the overturning unbalanced motion, an unbalanced condition which causes extreme floor vibration.

It is obvious that should the machine be stopped with the cranks that connect through the casing or carrier on what might be their dead center, then the arms 65 and 66, being at a 90° lag, will move the carrier off such dead center position when the machine is started. Likewise, should the arms 65 and 66 be on their dead center, the shaft portions 41 and 42, being connected through the carrier, are 90° in advance of such dead center, and, therefore, the rotation will start through the shaft portions 41 and 42, thus insuring positive rotation of both crankshafts in the same direction and a continuous gyration of the carrier with substantially no vibration.

What I claim and desire to secure by Letters Patent is:

1. A sifting apparatus including a stationary frame having spaced apart ends, a carrier for sifter elements, vertically spaced apart main bearings fixed to opposite sides of the stationary frame, crankshafts having main shaft portions journaled in said fixed bearings to rotate on fixed vertical axes extending through said bearings, said crankshafts each having parallel end shaft portions offset radially from the main shaft portion with axes thereof in vertical alignment to gyrate about the fixed axes, vertically spaced apart brackets projecting from the carrier at opposite sides thereof, bearings on said end shaft portions and fixed to said brackets for bodily supporting the carrier by and between said end shaft portions of the crankshafts, arms extending laterally from one of said end shaft portions of each crankshaft in trailing relation to the gyration of said shaft portions, a tie bar, means connecting the ends of the tie bar with said arms to connect one of the crankshafts with the other of said crankshafts, counterbalance means carried by the crankshafts from the sides thereof opposite said shaft portions, and means on the stationary frame for driving the said other of the crankshafts to rotate the crankshafts in synchronism through said bar for gyrating said carrier bodily within the stationary frame.

2. A sifting apparatus as described in claim 1 wherein said main shaft portions and said end shaft portions constitute separate parts for assembly of the main shaft parts within said main bearings with ends thereof projecting through the main bearings and said end shaft portions that provide the cranks having ends lapping said projecting ends of the main shaft parts, said lapping ends having registering transverse grooves, split clamps embracing said lapping ends, and fastening devices having shanks projecting through openings in the split clamps and through the registering grooves to key the main and end shaft portions together.

3. A sifting apparatus including a stationary frame having opposed sides, a carrier for sifter elements, vertically spaced apart main bearings fixed to both opposite sides of the stationary frame, crankshafts having main shaft portions journaled in said bearings to rotate on fixed vertical axes on the stationary frame, said crankshafts each having end shaft portions offset from the main shaft portion with axes thereof in vertical alignment and parallel with the fixed axes to gyrate about the fixed axes to provide cranks, brackets projecting from upper and lower portions of the carrier at opposite sides thereof, bearings on said cranks and fixed to said brackets for bodily supporting the carrier by and between said end shaft portions of the crankshafts, arms extending laterally from two corresponding end shaft portions and in trailing relation with said cranks that are provided thereby, a tie bar connecting the arm of one of the crankshafts with the arm of the other of said crankshafts, a weight bucket connected with the main shaft portion of each crankshaft on the side opposite said end shaft portions and between said main bearings to revolve about the fixed axes of the crankshafts, weight elements in said buckets, and means on the stationary frame for driving the said other of the crankshafts to gyrate said carrier bodily within the stationary frame in counterbalance with the weight elements, said frame being of a size and said brackets having a length for the weight buckets to pass between said main shaft portion and the carrier during revolution of the weight buckets 4. A sifting apparatus as described in claim 3, wherein the weight buckets have closed bottoms and open tops, and the weight elements constitute upper and lower sets of disks of sufficient number to provide the desired balance, and spacer disks interposed between the weight disks to retain the sets of weight disks in position near the main bearings.

5. A sifting apparatus including a stationary frame having interconnected opposite sides, a carrier for sifter elements, vertically spaced apart main bearings fixed to both opposite sides of the stationary frame, crankshafts having main shaft portions journaled in said bearings to rotate on fixed vertical axes and having end shaft portions laterally offset from the main shaft portions with axes thereof in vertical alignment and parallel with the fixed axes to gyrate about the fixed axes, brackets projecting from upper and lower portions of the carrier at opposite sides thereof, bearings on said end shaft portions and fixed to said brackets for bodily supporting the carrier by and between said end shaft portions of the crankshafts, a driving connection between the crankshafts to connect one of the crankshafts with the other in trailing relation with gyration of the carrier, a weight bucket connected with the main shaft portion of each crankshaft on the side opposite the end shaft portions and between said main bearings to revolve about the fixed axes of the crankshafts, upper and lower sets of weight elements in said buckets, substantially light weight spacers between the upper and lower sets of weight elements, and means on the stationary frame for driving the said other of the crankshafts to gyrate the carrier within the stationary frame in balance with the weight elements.

6. A sifting apparatus as described in claim 5, and guards having fixed connection with said ends of the stationary frame at points above and below the weight buckets and providing mountings for said main bearings.

7. A sifting apparatus including a stationary frame having interconnected opposite sides, a carrier for sifter elements, vertically spaced apart main bearings fixed to both opposite sides of the stationary frame, crankshafts having main shaft portions journaled in said bearings to rotate on fixed vertical axes and having end shaft portions offset laterally from the main shaft portion with axes thereof in vertical alignment to gyrate about the fixed axes, brackets projecting from upper and lower portions of the carrier at opposite sides thereof, bearings on said end shaft portions and fixed to said brackets for bodily supporting the carrier by and between said end shaft portions of the crankshafts, arms extending laterally from corresponding end shaft portions of each crankshaft at substantially right angles with respect to the cranks that are provided by said end shaft portions, a tie bar, wrist pins fixed to the tie bar at the respective ends thereof, antifriction bearings carried by said arms and journaling the wrist pins to connect the crankshafts and to rotate one of the crankshafts from the other of said crankshafts, a weight bucket connected with the main shaft portion of each crankshaft entirely on the side opposite the cranks and between said main bearings to revolve about the fixed axes of the crankshafts, weight elements in said buckets, and means on the stationary frame for driving the said other of the crankshafts to gyrate the carrier of the sifter elements bodily within the stationary frame.

8. A sifting apparatus including a stationary frame having opposite ends, a carrier for sifting elements within said frame, crankshafts having main shaft portions journaled at each end of the stationary frame to rotate on fixed vertical axes, said main shaft portion having cranks on the upper and lower ends thereof to gyrate around said vertical axes, brackets projecting from upper and lower portions of the carrier at opposite sides thereof and having journal connections with said cranks of the crankshaft for bodily supporting the carrier on said cranks to gyrate horizontally within said stationary frame while the cranks revolve about the fixed vertical axes of the main crankshaft portions, arms extending laterally with respect to two corresponding cranks of each crankshaft, a tie bar, means pivotally connecting ends of the tie bar with the arms for connecting one of the crankshafts with the other of said crankshafts, a counterbalance means carried by main portions of each crankshaft to balance thrusts imparted to the cranks by gyration of the carrier, and means for driving the said other of the crankshafts, said frame being of a size and the brackets being of a length for the counterbalance means to pass between said main shaft portions and said carrier.

References Cited in the file of this patent

UNITED STATES PATENTS

| | | |
|---|---|---|
| 567,963 | Dawson | Sept. 22, 1896 |
| 720,114 | Combs | Feb. 10, 1903 |
| 1,327,636 | Snyder et al. | Jan. 13, 1920 |
| 2,093,495 | Thompson | Sept. 21, 1937 |